(12) United States Patent
Kaluskar et al.

(10) Patent No.: US 9,521,146 B2
(45) Date of Patent: Dec. 13, 2016

(54) PROOF OF POSSESSION FOR WEB BROWSER COOKIE BASED SECURITY TOKENS

(71) Applicant: Microsoft Corporation, Redmond, WA (US)

(72) Inventors: Sanket Kaluskar, Snoqualmie, WA (US); Dejan Subotic, Kirkland, WA (US); Tarek Kamel, Issaquah, WA (US); Adrian Frei, Seattle, WA (US); Guruprasad Aphale, Redmond, WA (US); Allan Wetter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/971,835

(22) Filed: Aug. 21, 2013

(65) Prior Publication Data

US 2015/0058621 A1   Feb. 26, 2015

(51) Int. Cl.
| | | |
|---|---|---|
| *H04L 29/06* | (2006.01) | |
| *G06F 21/33* | (2013.01) | |
| *G06F 21/34* | (2013.01) | |
| *G06F 21/57* | (2013.01) | |
| *H04L 29/08* | (2006.01) | |

(52) U.S. Cl.
CPC ........... *H04L 63/10* (2013.01); *G06F 21/335* (2013.01); *G06F 21/34* (2013.01); *G06F 21/57* (2013.01); *H04L 63/0838* (2013.01); *H04L 63/105* (2013.01); *G06F 2221/2137* (2013.01); *H04L 63/168* (2013.01); *H04L 67/146* (2013.01)

(58) Field of Classification Search
CPC ...... H04L 63/08; H04L 63/10; H04L 63/0807; G06F 21/31

USPC ................... 726/4, 9; 713/159, 168
See application file for complete search history.

(56) References Cited

U.S. PATENT DOCUMENTS

| | | | |
|---|---|---|---|
| 7,478,434 B1 | 1/2009 | Hinton et al. | |
| 7,690,026 B2* | 3/2010 | Zhu | G06F 21/33 |
| | | | 726/8 |
| 7,865,777 B2* | 1/2011 | Verbowski | G06F 11/3466 |
| | | | 714/33 |
| 8,200,834 B2 | 6/2012 | Williams | |
| 2002/0107852 A1* | 8/2002 | Oblinger | G06F 17/30702 |
| 2004/0015723 A1* | 1/2004 | Pham | H04L 63/10 |
| | | | 726/27 |

(Continued)

FOREIGN PATENT DOCUMENTS

| | | |
|---|---|---|
| EP | 2498529 A1 | 9/2012 |
| WO | 2011091313 A1 | 7/2011 |

OTHER PUBLICATIONS

"International Search Report & Written Opinion for PCT Application No. PCT/US2014/051570", Mailed Date; Nov. 11, 2014, 9 pages.

(Continued)

*Primary Examiner* — Dao Ho
(74) *Attorney, Agent, or Firm* — Bryan Webster; Dan Choi; Micky Minhas

(57) ABSTRACT

In one embodiment, a user device 110 may access a network service 122 using a secure cookie 300. A high trust process may create an authentication proof 360 using a secure key. The high trust process may provide a browsing token 310 and the authentication proof 360 to a low trust process to send to an authentication service 124.

20 Claims, 11 Drawing Sheets

(56) References Cited

U.S. PATENT DOCUMENTS

| | | | |
|---|---|---|---|
| 2004/0128392 | A1 | 7/2004 | Blakley, III et al. |
| 2008/0010455 | A1* | 1/2008 | Holtzman ............. H04L 9/3228 713/168 |
| 2009/0097661 | A1* | 4/2009 | Orsini ................... H04L 9/3213 380/279 |
| 2011/0247045 | A1 | 10/2011 | Rajagopal et al. |
| 2012/0023568 | A1* | 1/2012 | Cha ....................... G06F 21/335 726/10 |
| 2013/0086656 | A1 | 4/2013 | Paddon et al. |
| 2014/0189791 | A1* | 7/2014 | Lindemann et al. ............. 726/3 |
| 2014/0331060 | A1* | 11/2014 | Hayton ......................... 713/186 |

OTHER PUBLICATIONS

Andrade, Andre., "Strong Mobile Authentication in Single Sign-On Systems", Retrieved at <<http://sauth-shibboleth-qca.eclipselabs.org.codespot.com/files/andrade_master_thesis_final_08052011.pdf>>, In Master's Thesis, May 8, 2011, pp. 101.

Chou, David., "Strong User Authentication on the Web", Retrieved at <<http://msdn.microsoft.com/en-us/library/cc838351.aspx>>, Aug. 2008, pp. 15.

"SAML V2.0 Holder-of-Key Web Browser SSO Profile Version 1.0", Retrieved at <<http://docs.oasis-open.org/security/saml/Post2.0/sstc-saml-holder-of-key-browser-sso-cd-01.html>>, Mar. 9, 2009, pp. 24.

Second Written Opinion Issued in PCT Application No. PCT/US2014/051570, Mailed Date: Aug. 12, 2015, 5 Pages.

\* cited by examiner

*400*

*600*

*700*

PROOF OF POSSESSION FOR WEB BROWSER COOKIE BASED SECURITY TOKENS

BACKGROUND

When a browser accesses a website, the web site may store a small data set, referred to as a cookie, with the browser of a user. The website may use the cookie to maintain a record of the state of the website as presented to the user. The website may also use the cookie track a secure session between the user and the website. The website may track the user by receiving reports from other websites that read the cookie of that website in the browser.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to accessing a network service using a secure cookie. A high trust process may create an authentication proof in a secure context using a secure key. The high trust process may provide a browsing token and the authentication proof to a low trust process to send to an authentication service.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
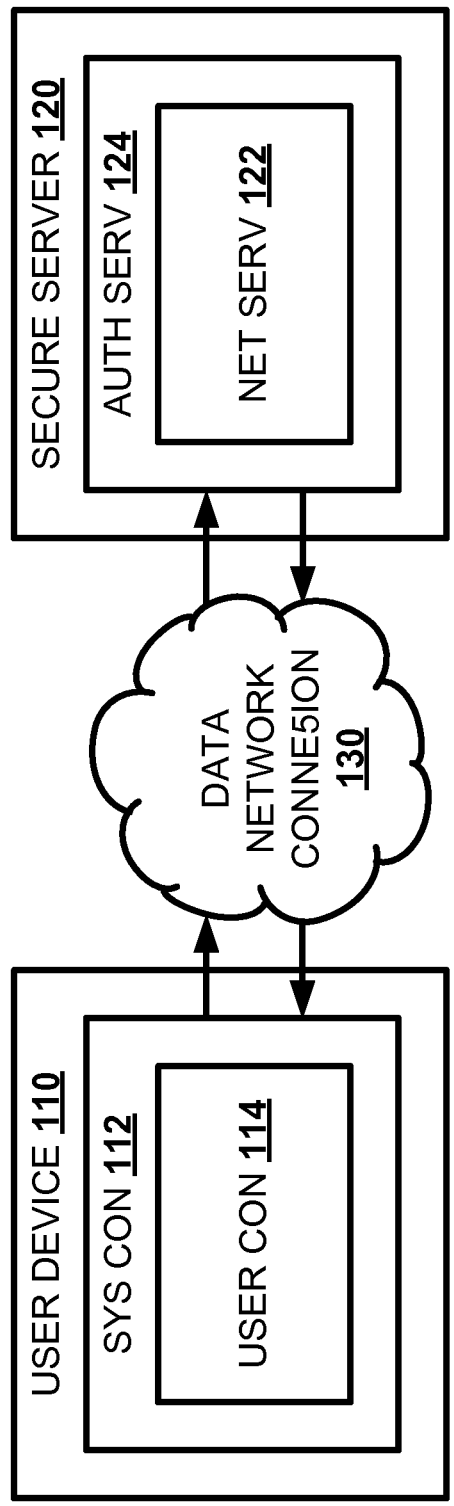
FIG. 1 illustrates, in a block diagram, one embodiment of a computing network that uses a secure cookie.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a network service access client.

A browser operating on a user device may access a secured network service by providing a set of login credentials, such as a username and password, to an authentication service. The authentication service may then determine if the user has a user account that grants access to a secured network service. The browser may subsequently access the secured network service using a cookie containing a browsing token. The browsing token may alert the authentication service that the user has been previously authenticated. A cookie with a browsing token may be susceptible to theft by a malevolent actor. The malevolent actor may then use the cookie having a browsing token to access the network service. The malevolent actor may then hijack the user account or steal private user data.

The authentication service may protect the user account of the network service by using a secure cookie developed in a secure context on the user device. The authentication service may issue a browsing token to the user device accompanied by a secure key, such as a cryptographic key. The secure key may be accessible by a high trust process. A high trust process is a process running in a secure context, such as a system context or a secure module. A secure context limits the vulnerability of data or a process by limiting access to the data and the process. A system context is data stored or a process executed at an operating system level privilege. A secure module is a physical device designed to store data or execute processes using protective security features. A low trust context, as opposed to the high trust context of the secure context, increases the vulnerability of the data or the process but increases the flexibility and usefulness of the data or the process by increasing access. Processes running in a low trust context, such as a user context process and most malware, may be prevented from accessing the key in a secure context, limiting the chances of key theft.

Proving ownership of the browsing token may imply proving possession of the accompanying secure key. The high trust process may perform a time sensitive cryptographic operation using the secure key, such as creating an authentication proof. The authentication proof may be a time sensitive signature of the browsing token using the secure key. The secure key may remain in the secure context, such as a system context or a secure module. A user context process, such as an internet browser, may ask a system context process to generate a proof of possession. The user context process may then present the browsing token and the authentication proof in lieu of a username and a password to an authentication service in order to grant the user access to the network service. Although the browsing token and authentication proof together may be stolen and reused on a separate device, the quick expiration of the authentication proof may limit the value of such a theft.

Thus, in one embodiment, a user device may access a network service using a secure cookie. A high trust process, such as a system context process, may create an authentication proof using a secure key. The high trust process may provide a browsing token and the authentication proof to a low trust process, such as a user context process, to send to an authentication service. The low trust process may receive the authentication proof created using the secure key in the high trust process. The low trust process may send the browsing token and the authentication proof to access the authentication service.

FIG. 1 illustrates, in a block diagram, one embodiment of a computing network 100 that uses a secure cookie. A user device 110 acting as a network service access client may connect to one or more secure servers 120 via a data network connection 130. The data network connection 130 may be an internet connection, a wide area network connection, a local area network connection, or other type of data network connections. A user device 110 may execute a process in a secure context or a low trust context. A high trust process, such as a system context (SYS CON) process 112, is a process executing in a secure context that has sufficient security protections in place to prevent the corruption or theft of any data stored or processed therein. A system context process 112 is a process that executes with administrative privileges and protections equivalent to the operating system. A low trust process, such as a user context (USER CON) process 114, has fewer security protections and administrative privileges to allow the low trust process to launch easily with less oversight. A user context process 114 is a process that executes as part of a user application with the equivalent level of administrative privileges and protections.

The user device 110 may implement a user context process 114, such as a browser or an applet, to access a network service (NET SERV) 122 executed on the secure server 120. A network service 122 is a network based user service, such as e-mail, a social network, online banking, cloud resource, or other online application. Prior to accessing the network service 122, the user device may verify the user with an authentication service (AUTH SERV) 124. The authentication service 124 may determine if the user has an account with the network service 122. The authentication service 124 may be executed on the secure server 120, or may be executed by a physically or logically separate server. The authentication service 124 may use a login credential, such as a user name and password, biometric identifier, or other unique identifier, to verify the user.

Once the authentication service 124 has verified the user, the authentication service 124 may provide the user device with resources to create a secure cookie to identify a verified user to the network service 122. To prevent the theft of the secure cookie by a malevolent actor, the user device 110 and secure server 120 may use a bifurcated cookie creation process that creates an authentication proof in a secure context to accompany a browsing token. The system context process 112, being a high trust process, may present login credentials to the authentication service 124, either when the user context process 114, being a low trust process, seeks access to the network service 122 or at any time prior to access of the network service 122 by the user context process 114. For a protected system context process, the login credentials may be the same to access the system context process 112 as to access the authentication service 124. Alternately, the system context process 112 may request login credentials from the user via an application programming interface with the user context process 114 when the user context process 114 seeks to access the network service 122.

The authentication service 124 may provide the system context process 112 with a browsing token and a secure key. The browsing token is a data set that allows the user to pass the authentication service 124 without resubmission of the login credentials when accompanied by the proper parameters. The system context process 112 may use the secure key to create an authentication proof to accompany the browsing token, such as by signing the browsing token with the secure key. Alternately, a secure module may store the secure key and use the secure key to create the authentication proof. A secure module is a physical device specifically designed to protect data or a process, such as a trusted platform module or smart card. The user context process 114 may create a secure cookie based on the browsing token and the authentication proof.

The authentication service 124 may bind the browsing token to a set of one or more service tokens. A service token represents additional layers of authorization or authentication for a network service 122. A user may provide further credentials to the authentication service to receive additional service tokens. Alternately, a user's login account may be automatically associated with further layers of authorization represented by the service tokens. The authentication service 124 may bind a set of service tokens to the browsing token. The user context process 114 may present the service tokens, along with the authentication proof and the browsing token, to access additional network services 122 designated by the authentication service 124.

Figure 2:
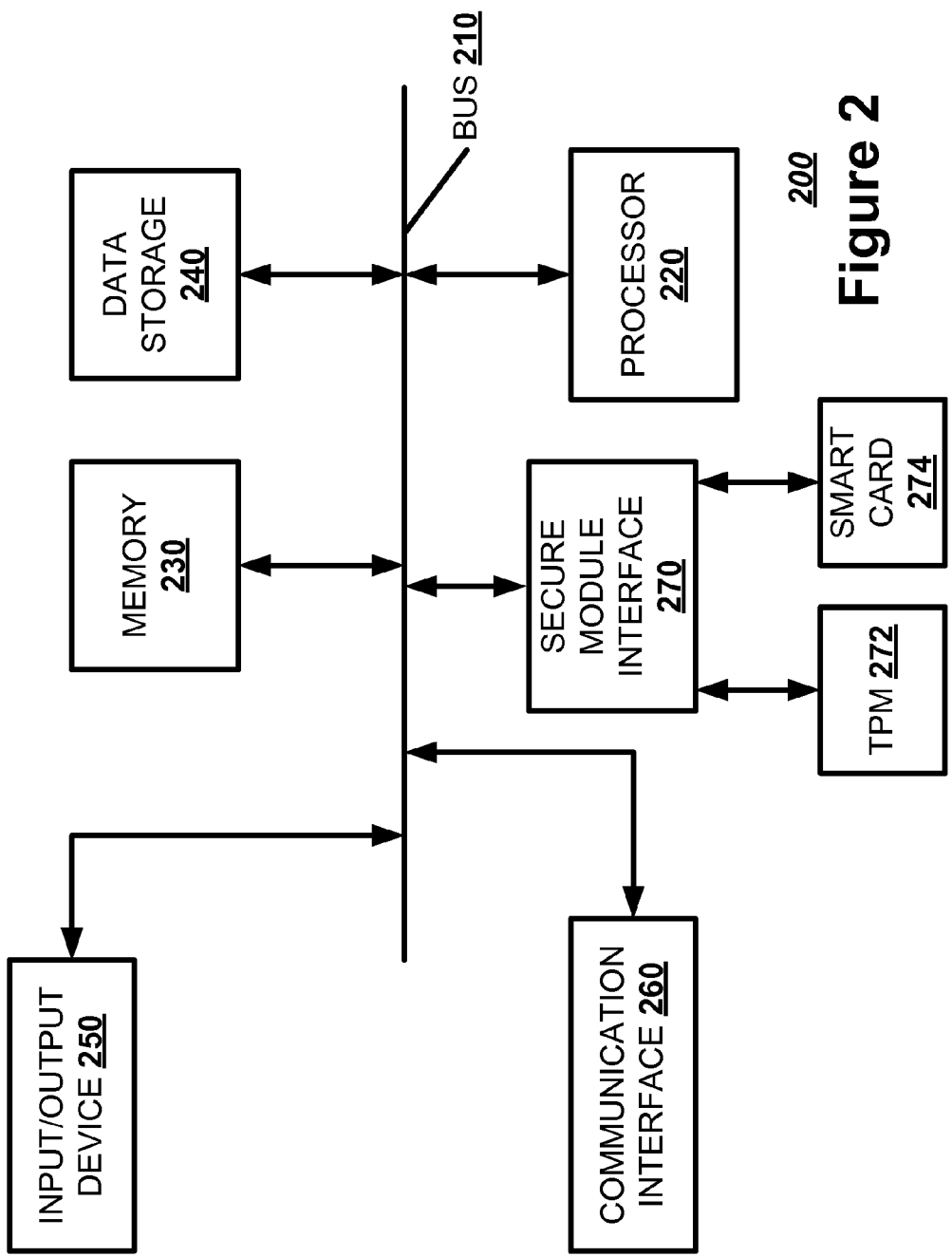
FIG. 2 illustrates, in a block diagram, one embodiment of a computing device.

FIG. 2 illustrates a block diagram of an exemplary computing device 200 which may act as a network service access client or a secure server 120. The computing device 200 may combine one or more of hardware, software, firmware, and system-on-a-chip technology to implement a network service access client or a secure server 120. The computing device 200 may include a bus 210, a processor 220, a memory 230, a data storage 240, an input/output device 250, a communication interface 260, and a secure module interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

A secure module interface 270 may interact with a secure module to perform computing functions or store data more securely. A secure module interface 270 may connect to a trusted platform module 272 or a smart card 274. A trusted platform module 272 is a module that has security features in place to protect data during storing and processing. A smart card 274 is a portable card carried by the user that may protect data during storing and processing.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
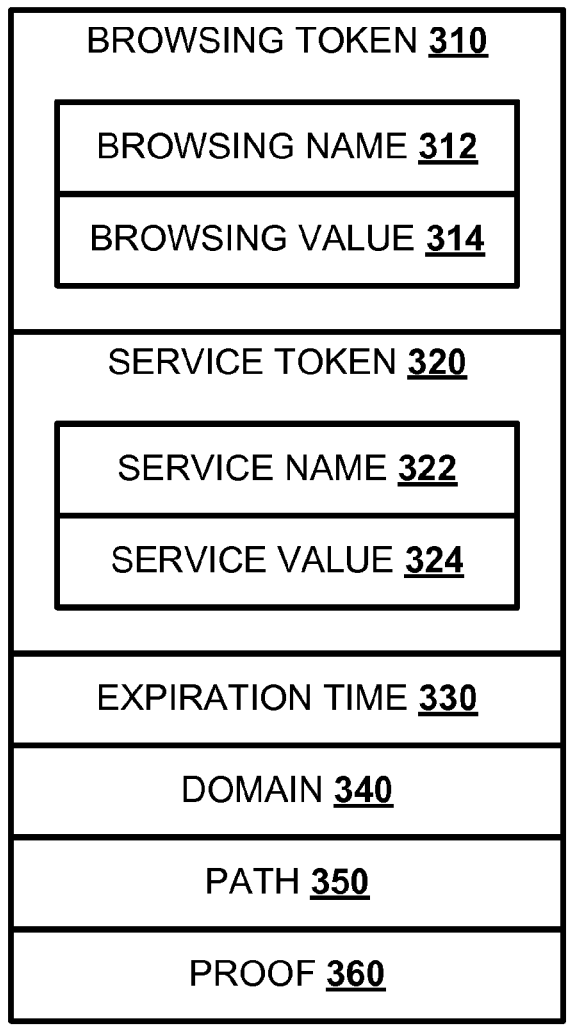
FIG. 3 illustrates, in a block diagram, one embodiment of a secure cookie.

FIG. 3 illustrates, in a block diagram, one embodiment of a secure cookie 300. A secure cookie 300 may have a browsing token 310 provided by the authentication service 124. A browsing token 310 may have a browsing name 312 identifying the browsing token 310 and a browsing value 314. The secure cookie 300 may additionally have a set of one or more service tokens 320 indicating additional layers of authorization or authentication. A service token may have a service name 322 identifying the service token 320 and a service value 324. The secure cookie 300 may have an expiration time period 330, indicating the length of time for which the secure cookie 300 is valid. The expiration time period 330 may indicate that the secure cookie 300 is a single use cookie. The expiration time period 330 may indicate a period of time or a number of uses. The secure cookie 300 may have a domain name 340 and path 350 identifying the website receiving the browsing token 310. A domain name 340 identifies one or more internet protocol addresses. A path 350 identifies a file or a directory on a web server at the internet protocol address. The secure cookie 300 may have an authentication proof 360 created by a high trust process, such as a system context process 112, using a secure key provided by the authentication service 124. The authentication proof 360 may be a signature or an encryption of the secure cookie by the secure key.

Figure 4:
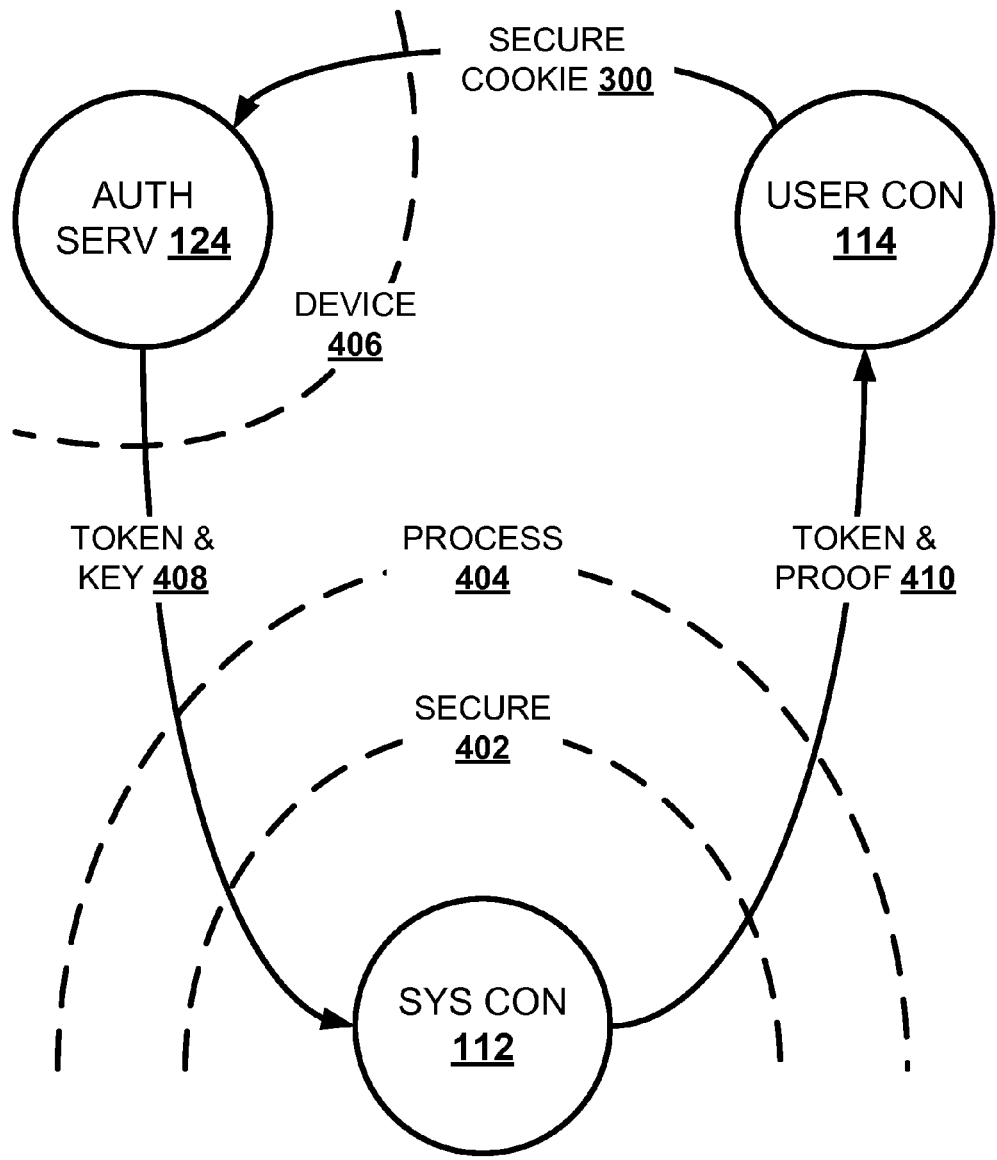
FIG. 4 illustrates, in a block diagram, one embodiment of a secure cookie exchange.

FIG. 4 illustrates, in a block diagram, one embodiment of a secure cookie exchange 400. During a secure cookie exchange 400, a system context process 112 may execute within a secure context 402, as a part of a specific system process 404. A user context process 114 may execute within the same device 406 as the system context process 112, but outside the secure context 402 and the specific system process 404. The authentication service 124 may act outside the device 406 operating the user context process 114 and the system context process 112.

The authentication service 124 may pass a browsing token 310 and secure key package 408 to the system context process 112. The secure key may remain in the system context. A system context process 112 may use the secure key to create an authentication proof 360, to be passed from the system context process 112 to the user context process 114 as part of a browsing token 310 and authentication proof 360 package 410. The user context process 114 may then use the browsing token 310 and authentication proof 360 package 410, possibly in the form of the secure cookie 300, to access the network service 122 via the authentication service 124.

Figure 5:
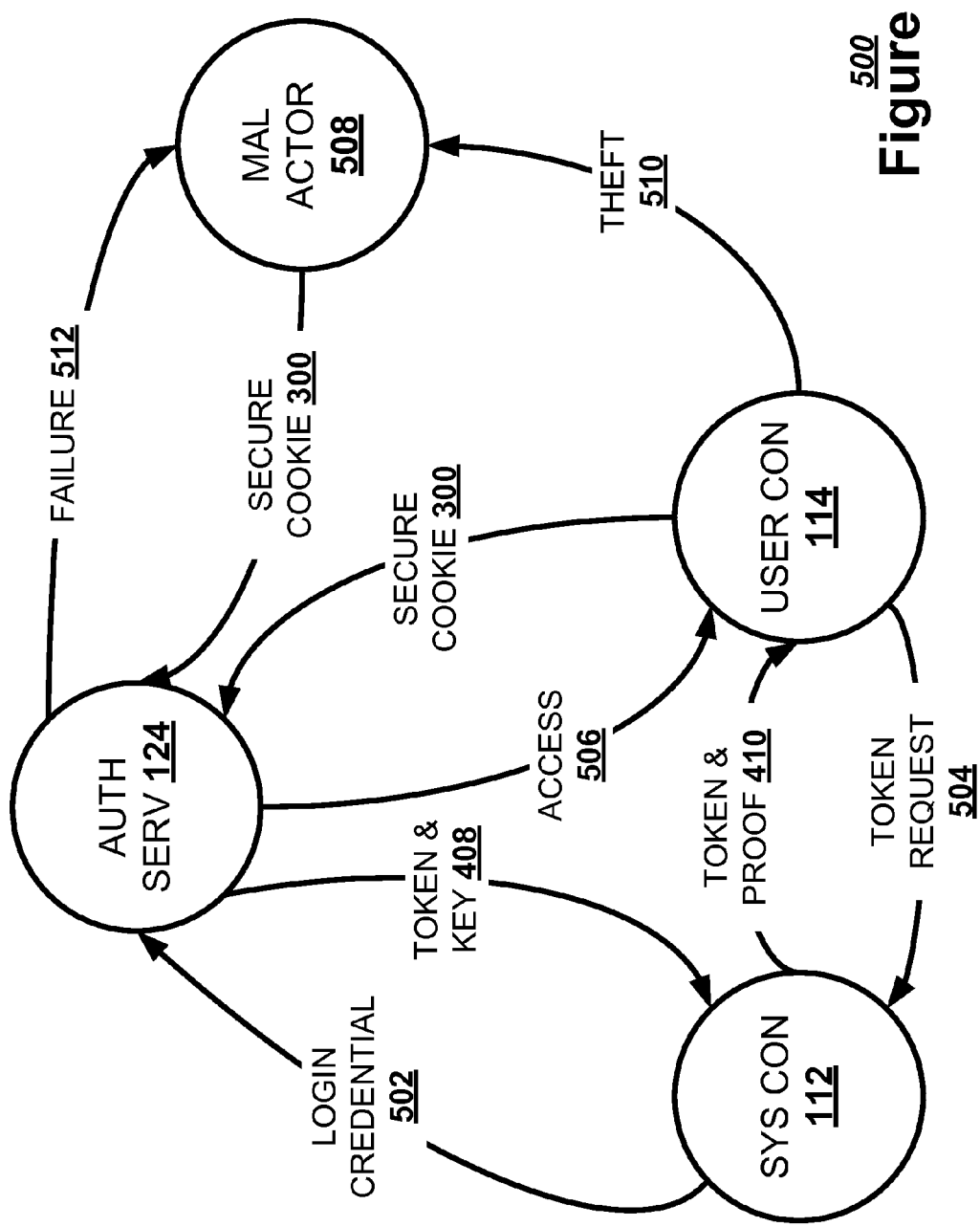
FIG. 5 illustrates, in a block diagram, one embodiment of a secure cookie theft.

FIG. 5 illustrates, in a block diagram, one embodiment of a secure cookie theft 500. A system context process 112 may provide a login credential 502, such as a username and password, to the authentication service 124. Upon validation by the authentication service 124, the authentication service 124 may provide the system context process 112 with the browsing token 310 and secure key package 408. The user context process 114 may send a token request 504 to the system context process 112. The system context process 112 may create an authentication proof 360 from the secure key and provide the user context process 114 with a browsing token 310 and authentication proof 360 package 410 in response. The user context process 114 may then create a secure cookie 300 from the browsing token 310 and authentication proof 360 package 410 and send the secure cookie 300 to the authentication service 124. If the secure cookie 300 has not expired, the authentication service 124 may return an access confirmation 506 to the user context process indicating successful access to the network service 122.

A malevolent actor 508 may attempt a theft 510 of the secure cookie 300 from the user context process 114. The malevolent actor 508 may send the secure cookie 300 to the authentication service 124 to attempt to access the network service 122. As the secure cookie 300 has expired and the malevolent actor 508 does not have access to the secure key, the authentication service 124 may send a failure notice 512 to the malevolent actor 508 denying access.

Figure 6:
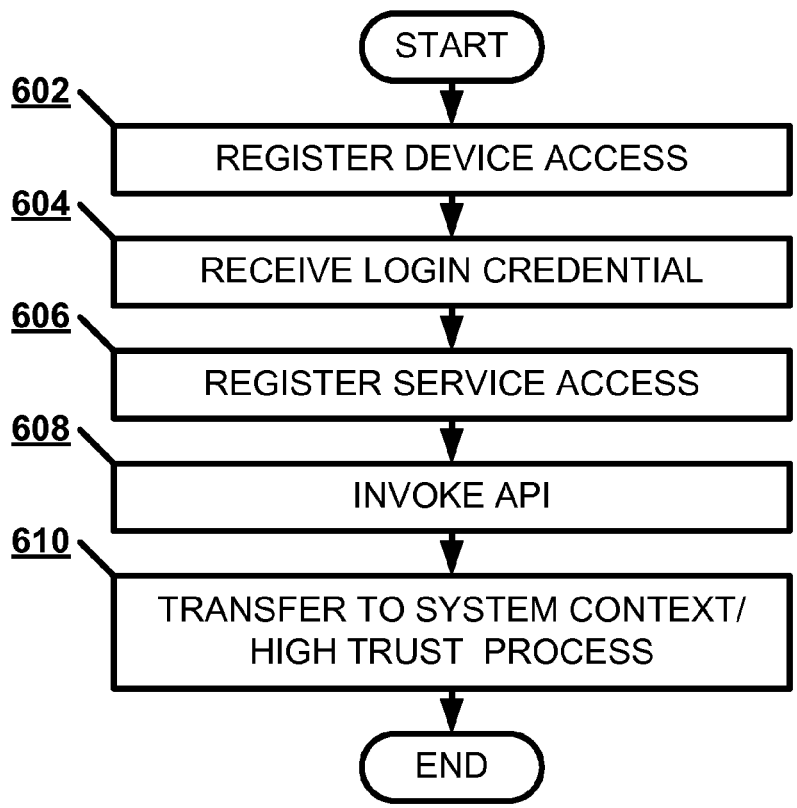
FIG. 6 illustrates, in a flowchart, one embodiment of a method of transitioning a login credential using a high trust process.

FIG. 6 illustrates, in a flowchart, one embodiment of a method 600 of transitioning a login credential using a high trust process, such as a system context process 112. The high trust process may register an access of a device system by a user (Block 602). A device system is an operating system for the user device 110. The high trust process may receive a login credential from a user upon access to the device system (Block 604). Alternately, the high trust process may receive the login credential via a user context process 114. The high trust process may register access of a network service 122 (Block 606). The high trust process may invoke an application programming interface (API) to transfer a user from the low trust process, such as a user context process 114, to a high trust process, such as a system context process 112 (Block 608). The high trust process may transfer a user from the low trust process, such as a user context process 114, to the high trust process, such as a system context process 112, upon access of a network service 122 (Block 610).

Figure 7:
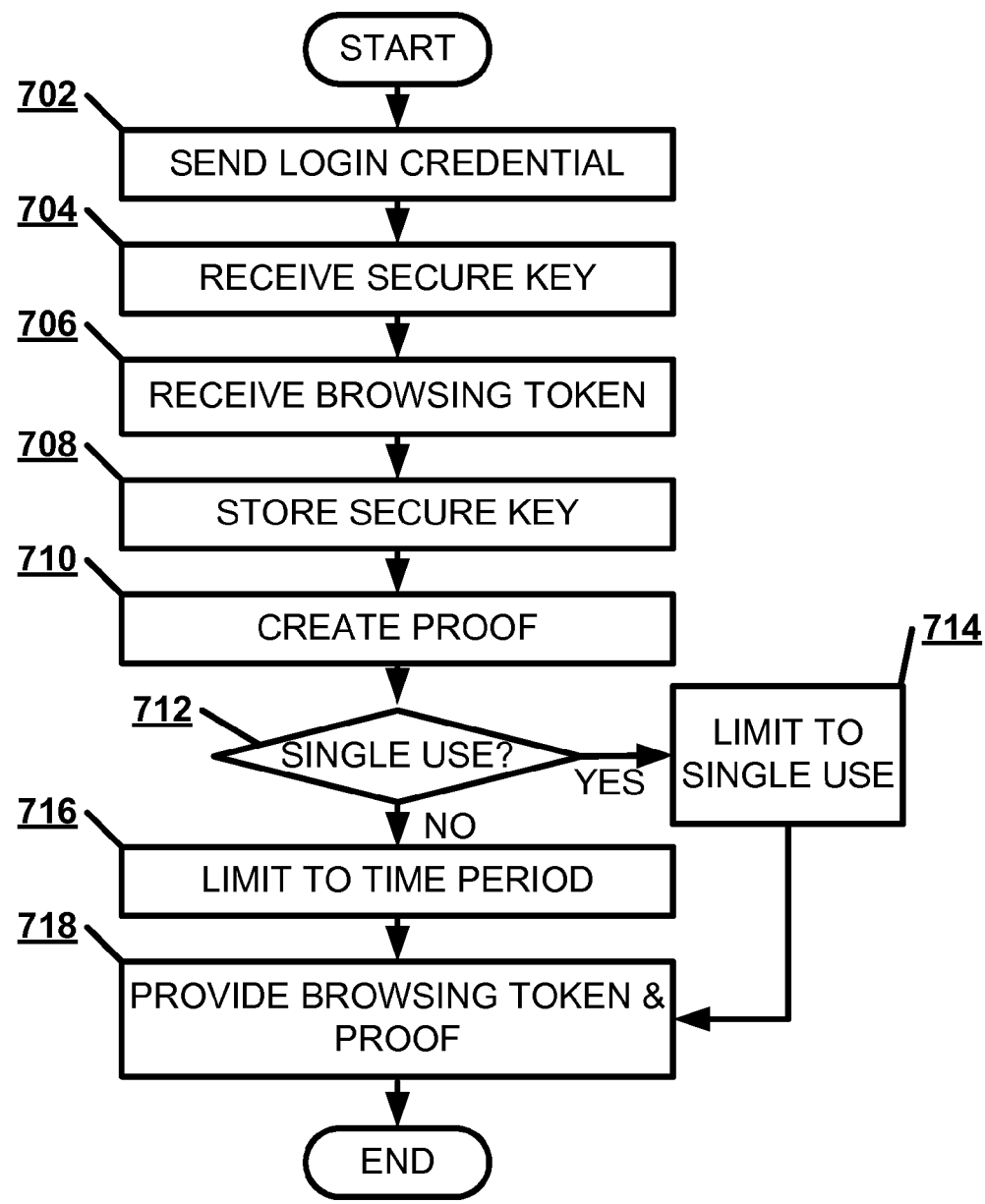
FIG. 7 illustrates, in a flowchart, one embodiment of a method of providing an authentication proof with a high trust process.

FIG. 7 illustrates, in a flowchart, one embodiment of a method 700 of providing an authentication proof 360 with a high trust process, such as a system context process 112. The high trust process, such as a system context process 112, may send a login credential 502 to the authentication service 124 (Block 702). The high trust process, such as the system context process 112, may receive a secure key from the authentication service 124 over a secure socket layer (Block 704). The high trust process may receive a browsing token 310 from the authentication service 124 (Block 706). The high trust process may store the secure key in a secure context, such as a system context or a secure module (Block 708).

The high trust process may create an authentication proof 360 in a secure context using a secure key (Block 710). The high trust process or the authentication service 124 may set an expiration time for the authentication proof 360. If the authentication proof 360 is to be a single use proof (Block 712), the high trust process may limit the authentication proof 360 to a single use (Block 714). Otherwise, the high trust process may limit the authentication proof 360 to an expiration time period 330 (Block 716). The high trust process may provide a browsing token and the authentication proof to a low trust process, such as a user context process 114, to send to an authentication service 124 to access a network service 122 (Block 718).

Figure 8:
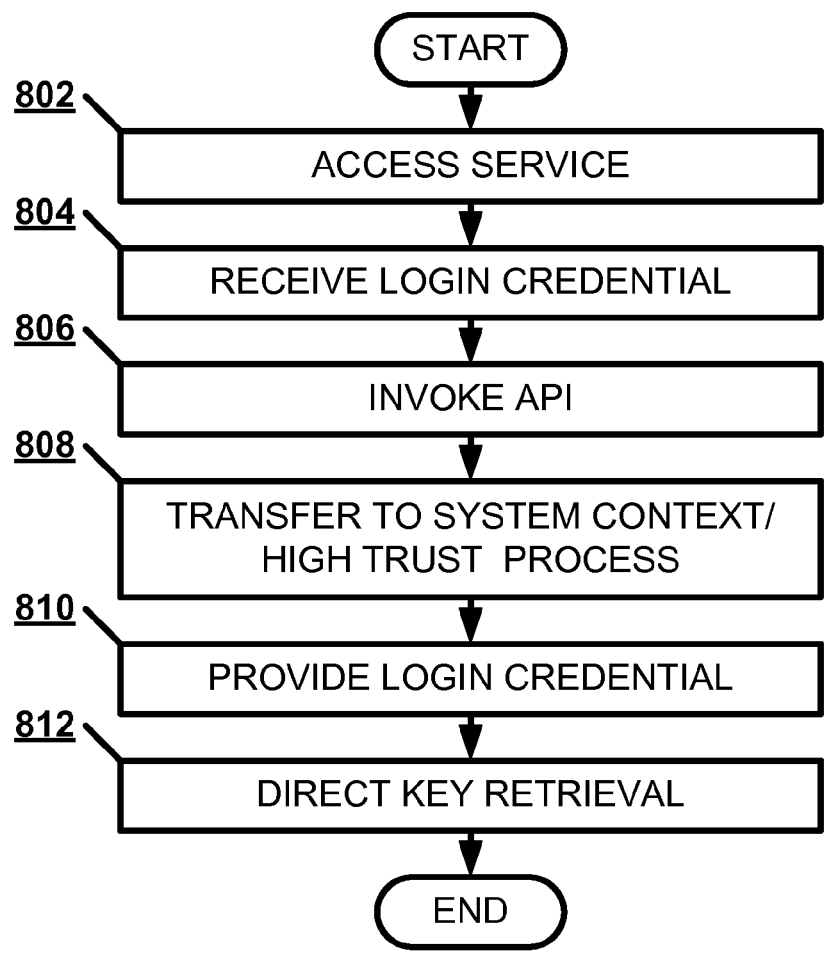
FIG. 8 illustrates, in a flowchart, one embodiment of a method of transitioning a login credential using a low trust process.

FIG. 8 illustrates, in a flowchart, one embodiment of a method 800 of transitioning a login credential using a low trust process, such as a user context process 114. The low trust process, such as a user context process 114, may access a network service 122 (Block 802). The low trust process may receive a login credential from a user upon access to a network service 122 (Block 804). Alternately, the login credentials may be provided to a system context process 112 upon access to the device system. The low trust process may invoke an application programming interface to transfer a user from the low trust process to the high trust process (Block 806). The low trust process may transfer a user from a low trust process to the high trust process upon access of the authentication service 124 (Block 808). The low trust process may provide the login credential to the high trust process (Block 810). The low trust process may direct the high trust process to send a login credential 502 to the authentication service 124 to retrieve the secure key (Block 812).

Figure 9:
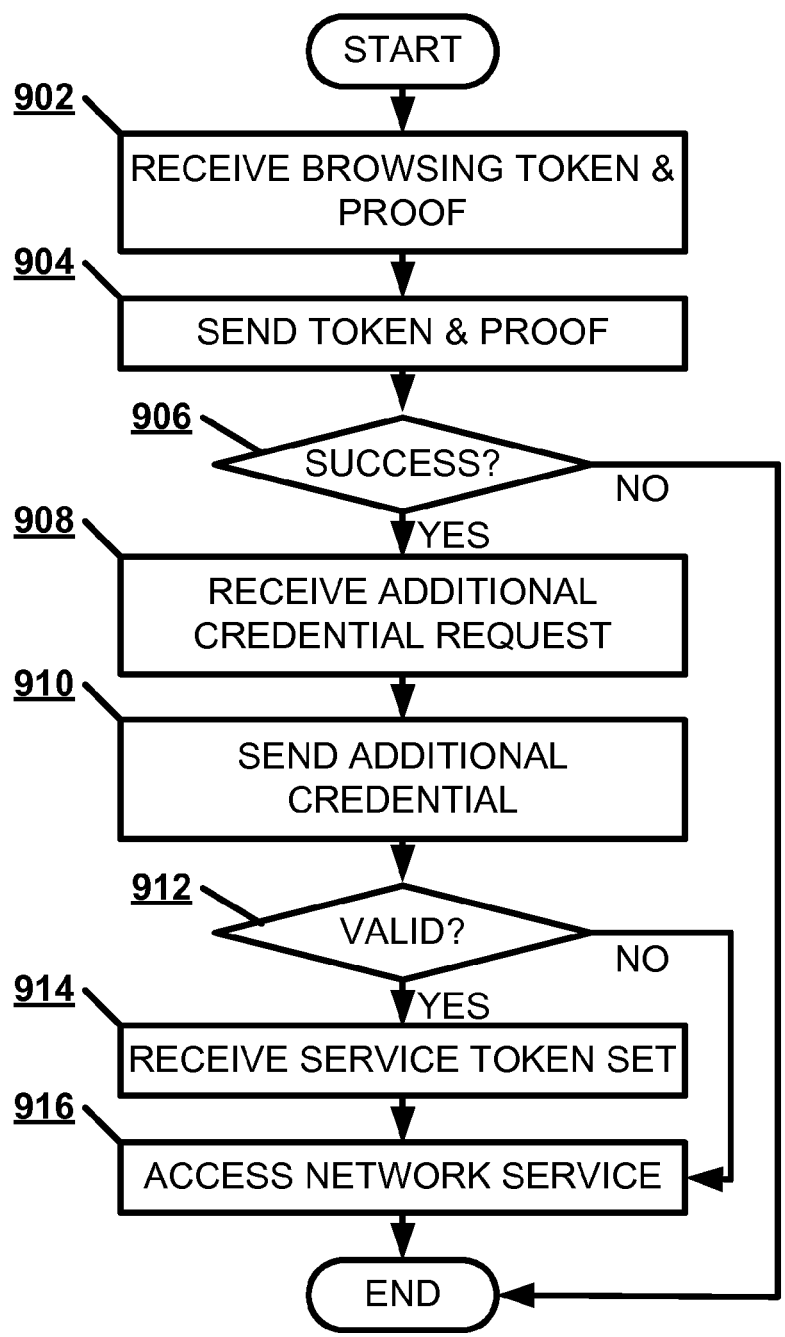
FIG. 9 illustrates, in a flowchart, one embodiment of a method of accessing a network service with a low trust process.

FIG. 9 illustrates, in a flowchart, one embodiment of a method 900 of accessing a network service 122 with a low trust process, such as a user context process 114. The low trust process may receive a browsing token 310 and an authentication proof 360 created using a secure key in a high trust process (Block 902). The low trust process may send the browsing token 310 and the authentication proof 360 to an authentication service 124 to access a network service 122 (Block 904). If the access of the authentication service is successful (Block 906), the low trust process may receive a request for further login credentials to access additional levels of network service 122 (Block 908). The low trust process may send additional login credentials to the authentication service 124 (Block 910). If the additional login credentials are valid (Block 912), the low trust process may receive a set of service tokens 320 bound to the browsing token by the authentication service 124 (Block 914). The low trust process may access a network service 122 using the set of service tokens 320 in conjunction with the browsing token 310 and the authentication proof 360 (Block 916).

Figure 10:
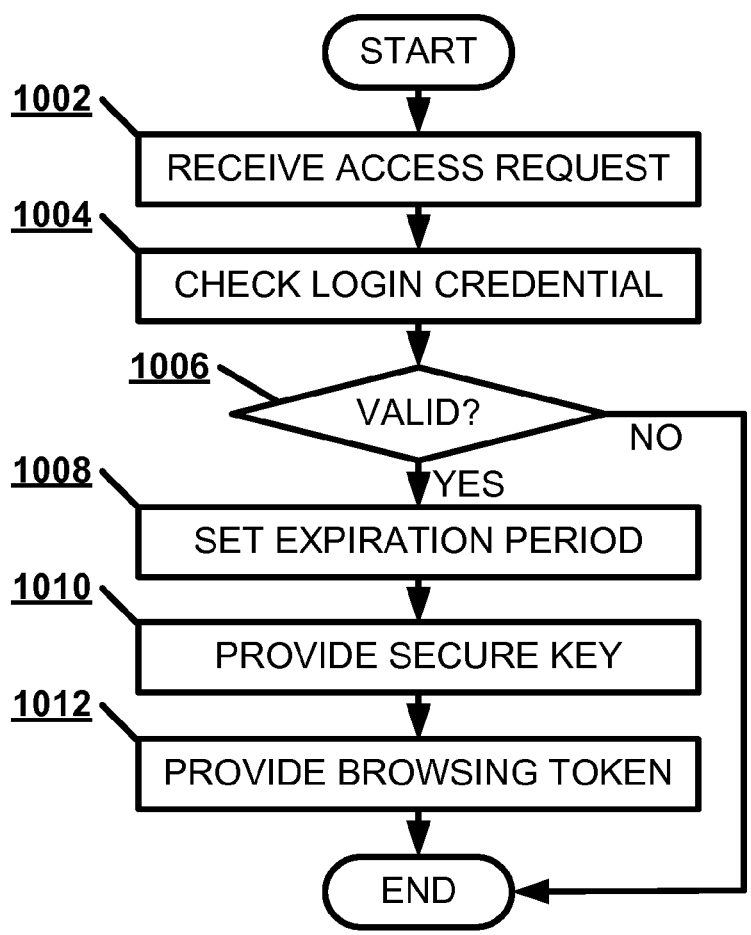
FIG. 10 illustrates, in a flowchart, one embodiment of a method of providing a secure key.

FIG. 10 illustrates, in a flowchart, one embodiment of a method 1000 of providing a secure key. The authentication service 124 may receive an access request containing a login credential from a high trust process, such as a system context process 112 (Block 1002). The authentication service 124 may check the login credential to validate a user (Block 1004). If the login credential is valid (Block 1006), the authentication service 124 may set an expiration time period for an authentication proof created by the secure key (1008). Alternately, the authentication service 124 may allow the user device to set the expiration time period, or to limit the authentication proof to a one time use. The authentication service 124 may provide a secure key to the high trust process via a secure socket layer (Block 1010). The authentication service 124 may provide a browsing token 310 to the high trust process via a secure socket layer or via a different path (Block 1012).

Figure 11:
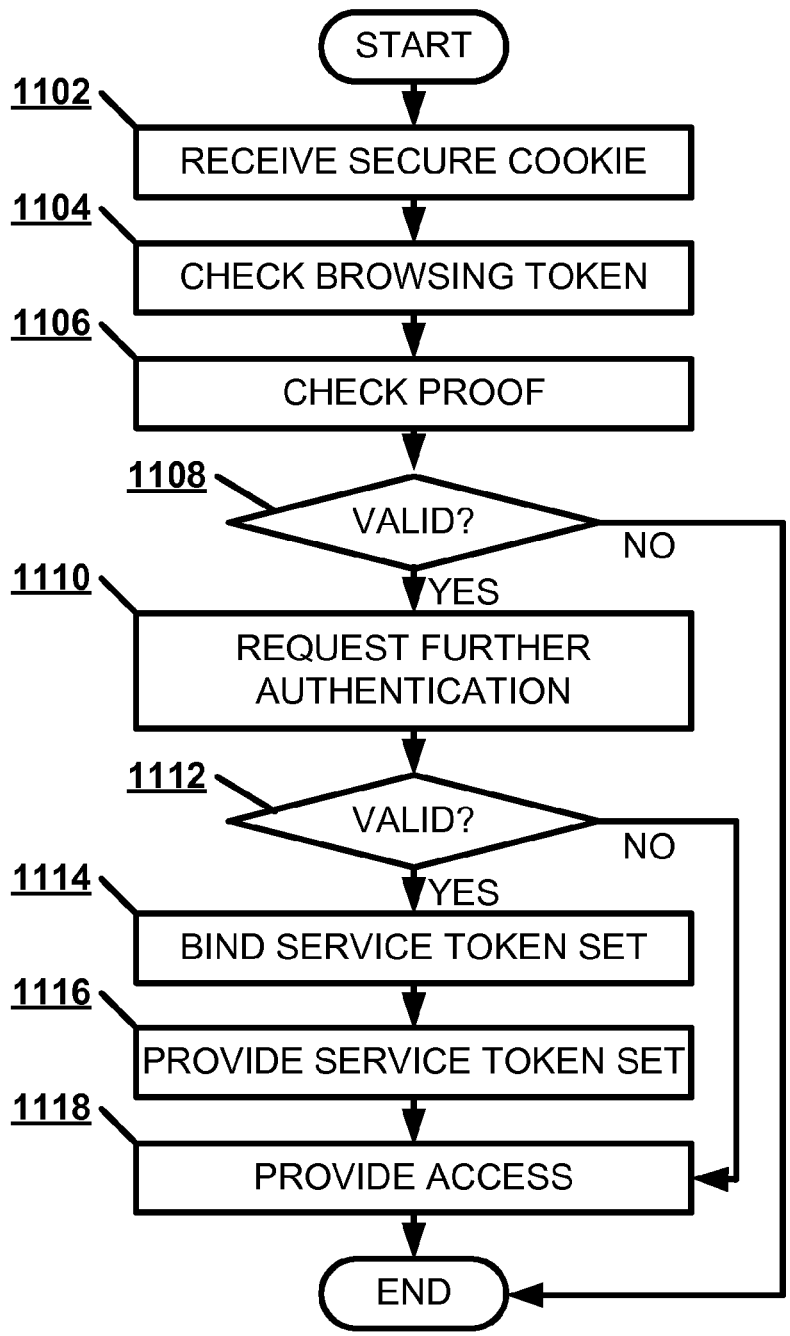
FIG. 11 illustrates, in a flowchart, one embodiment of a method of providing access to a network service.

FIG. 11 illustrates, in a flowchart, one embodiment of a method 1100 of providing access to a network service 122. The authentication service 124 may receive a secure cookie 300 from a low trust process, such as a user context process 114 (Block 1102). The authentication service 124 may check the browsing token 310 of the secure cookie 300 (Block 1104). The authentication service 124 may check that the authentication proof 360 of the secure cookie 300 is still valid (Block 1106). If the authentication proof 360 is still valid (Block 1108), the authentication service 124 may request further authentication before providing a set of service tokens 320 (Block 1112). If the further authentication is valid (Block 1114), the authentication service 124 may bind a set of service tokens 320 associated with the user account to the browsing token 310 (1110). The authentication service 124 may provide a set of service tokens 320 to the low trust process, such as a user context process 114, so that the low trust process may access a network service 122 by using the set of service tokens 320 in conjunction with the browsing token 310 and the authentication proof 360 (Block 1116). The authentication service 124 may provide the low trust process with the appropriate level of access to the network service 122 (Block 1118).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   sending a login credential to an authentication service for a network service from a system context process executing at an operating system level administrative privilege of a client device;
   receiving a browsing token and a secure key from the authentication service in the system context process;
   storing the secure key in a system context of a memory of the client device limiting access to the secure key to the operating system level administrative privilege;
   creating an authentication proof by creating a time sensitive signature of a browsing token in the system context of the client device using the secure key; and
   providing the browsing token and the authentication proof to a user context process executing at an application level administrative privilege of the client device to send to the authentication service to access the network service.

2. The method of claim 1, further comprising:
   register an access of a device system by a user.

3. The method of claim 1, further comprising:
   receiving the login credential from a user upon access to a device system.

4. The method of claim 1, further comprising:
   invoking an application programming interface to request the login credential from a user with the user context process.

5. The method of claim 1, further comprising:
   limiting the authentication proof to a single use.

6. The method of claim 1, further comprising:
   limiting the authentication proof to an expiration time period.

7. A tangible machine-readable storage device having a set of instructions detailing a method stored thereon that when executed by one or more processors cause the one or more processors to perform the method, the method comprising:
   sending a login credential to an authentication service for a network service from a system context process executing at an operating system level administrative privilege of a client device;
   receiving a browsing token and a secure key from the authentication service in the system context process;
   storing the secure key in a system context of a memory of the client device limiting access to the secure key to the operating system level administrative privilege;
   creating an authentication proof by creating a time sensitive signature of a browsing token in the system context of the client device using the secure key; and
   providing the browsing token and the authentication proof to a user context process executing at an application level administrative privilege of the client device to send to the authentication service to access the network service.

8. The tangible machine-readable storage device of claim 7, wherein the method further comprises:
   register an access of a device system by a user.

9. The tangible machine-readable storage device of claim 7, wherein the method further comprises:
   receiving the login credential from a user upon access to a device system.

10. The tangible machine-readable storage device of claim 7, wherein the method further comprises:
    invoking an application programming interface to request the login credential from a user with the user context process.

11. The tangible machine-readable storage device of claim 7, wherein the method further comprises:
    limiting the authentication proof to a single use.

12. The tangible machine-readable storage device of claim 7, wherein the method further comprises:
    limiting the authentication proof to an expiration time period.

13. A client device, comprising:
    a memory configured to store a secure key from an authentication service for a network service in a system context limiting data access to an operating system level administrative privilege;
    a processor connected to the memory configured to create an authentication proof by creating a time sensitive signature of a browsing token in a system context process executing at the operating system level administrative privilege of the client device using the secure key and further configured to provide the browsing token and the authentication proof to a user context process executing at an application level administrative privilege of the client device; and
    a communication interface configured to send a login credential to the authentication service from the system context process, further configured to receive the browsing token and secure key from the authentication service in the system context process, and also configured to send the browsing token and the authentication proof to the authentication service to access the network service for the user context process.

14. The client device of claim 13, further comprising:
    an input device configured to register an access of a device system by the user.

15. The client device of claim 13, wherein the processor is further configured to invoke an application programming interface to request the login credential from a user with the user context process.

16. The client device of claim 13, further comprising:
    an input device configured to receive a login credential from a user upon access to a device system.

17. The client device of claim 13, wherein the processor is further configured to limit the authentication proof to a single use.

18. The client device of claim 13, wherein the processor is further configured to limit the authentication proof to an expiration time period.

19. The client device of claim 13, wherein the communication interface is further configured to send an additional login credential from the user context process to the authentication service.

20. The client device of claim 13, wherein the communication interface is further configured to receive for the user context process a set of service tokens bound to the browsing token by the authentication service.

* * * * *